United States Patent [19]
Pueschel

[11] Patent Number: 5,820,229
[45] Date of Patent: Oct. 13, 1998

[54] METHOD AND APPARATUS FOR CONTROLLING A BRAKE SYSTEM OF A VEHICLE

[75] Inventor: Helmut Pueschel, Marbach, Germany

[73] Assignee: Robert Bosch, GmbH, Stuttgart, Germany

[21] Appl. No.: 712,223

[22] Filed: Sep. 11, 1996

[30] Foreign Application Priority Data

Oct. 7, 1995 [DE] Germany .................. 195 37 437.1

[51] Int. Cl.⁶ ...................................... B60T 8/58
[52] U.S. Cl. ...................... 303/139; 303/113.2
[58] Field of Search .................. 303/139, 140, 303/149, 145, 188, 113.2; 701/83

[56] References Cited

U.S. PATENT DOCUMENTS

| | | | |
|---|---|---|---|
| 5,293,315 | 3/1994 | Kolbe et al. | 303/139 X |
| 5,322,356 | 6/1994 | Kolbe et al. | 303/139 |
| 5,511,865 | 4/1996 | Howell | 303/139 |
| 5,688,029 | 11/1997 | Bach et al. | 303/139 |
| 5,735,585 | 4/1998 | Koike et al. | 303/145 |

FOREIGN PATENT DOCUMENTS 4107978  9/1992  Germany .

*Primary Examiner*—Lee W. Young
*Attorney, Agent, or Firm*—Fulbright & Jaworski

[57] ABSTRACT

As part of an automatic drive slip control system, the brake pressure in the wheel brake of a wheel which is starting to slip is built up and released. A valve which brings about the release of pressure in this wheel brake is actuated at timed intervals so as to maintain a desired pressure level during a control phase.

9 Claims, 4 Drawing Sheets

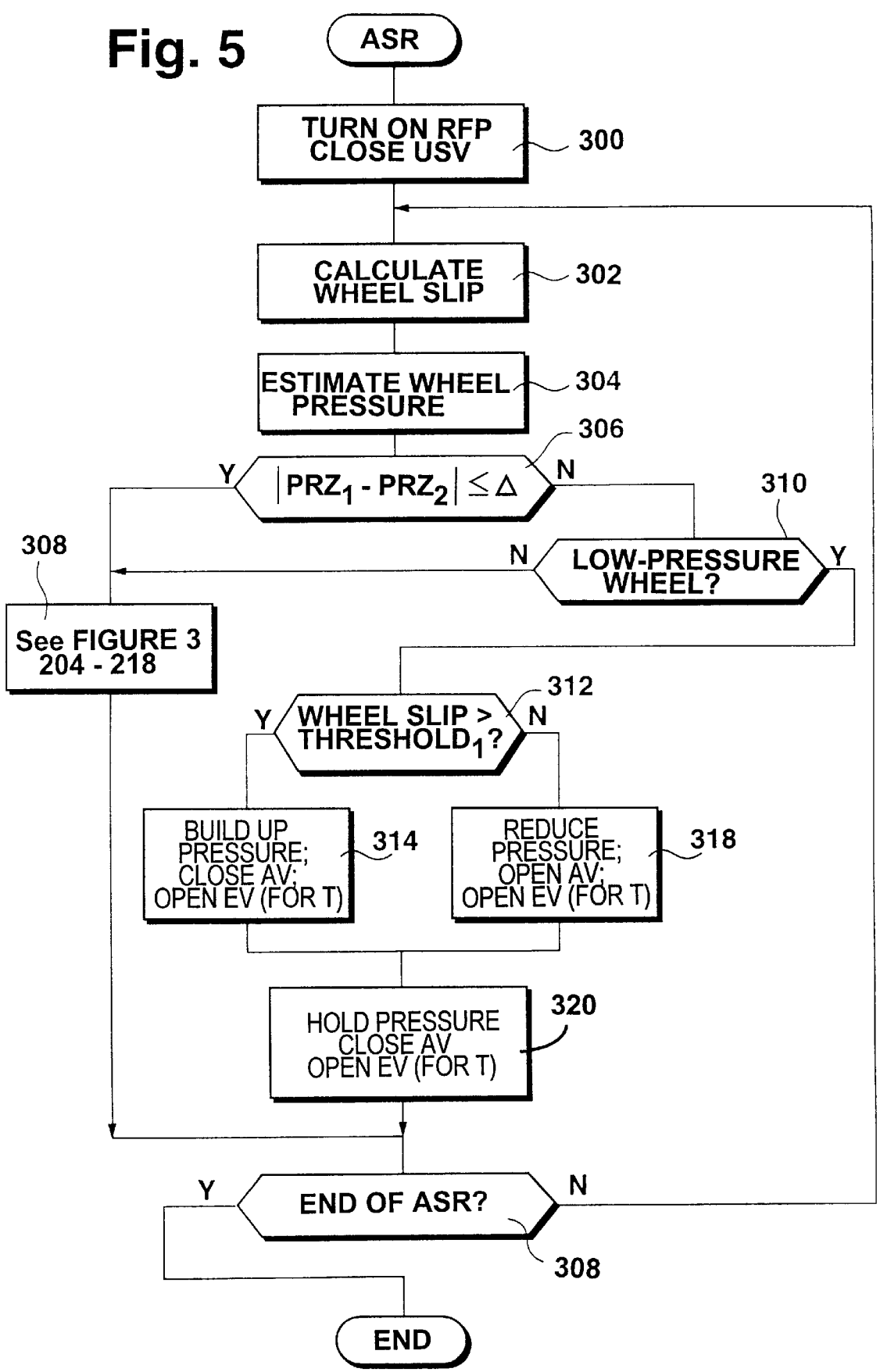

5,820,229

METHOD AND APPARATUS FOR CONTROLLING A BRAKE SYSTEM OF A VEHICLE

BACKGROUND OF THE INVENTION

The invention pertains to a method and to an apparatus for controlling the brake system of a vehicle according to the introductory clauses of the independent claims.

A method and an apparatus of the type indicated are known from DE 41 07 978 A1. In this document, the brake system of the vehicle is controlled as part of an automatic slip control system whenever an elevated level of slip occurs in at least one of the drive wheels. When elevated drive slip occurs in at least one of the drive wheels, an electronic control unit switches a control valve (switching valve USV) installed in the brake line leading to the drive wheel or wheels to its closed position; activates a pressure-generating means (return pump sRFP); builds up the pressure in at least one brake line; and switches another control valve (intake valve ASV) to its open position, so that the master brake cylinder of the brake system is connected to the inlet to the pressure-generating means. By appropriate control of another valve assembly (inlet and outlet valves, EV, AV) on at least one of the drive wheels, the brake pressure in this drive wheel is modulated in such a way as to reduce the drive slip to a defined range of values.

In this known automatic drive slip control system, the control valve (intake valve ASV) is open, and therefore the pump conveys pressure medium from the reservoir during the entire automatic slip control process. When no braking pressure is being built up at the brakes (brake line closed), the pressure medium flows back to the reservoir through a pressure-limiting valve, which bridges the switching valve U5V. The noise which is produced as a result is highly unsatisfactory.

U.S. Pat. No. 5,205,623 discloses a brake system which serves, among other things, to control drive slip automatically. When an elevated level of drive slip occurs in at least one of the drive wheels, the return pump is activated; the inlet and outlet valves on the wheel brakes, which are normally used to modulate the pressure, are opened; and the pressure is modulated by the appropriate opening and closing of the intake valve and the switching valve. While the return pump is running, the pressure builds up when the intake valve is open and the switching valve is closed; and the pressure is reduced when the intake valve is closed and the switching valve is open.

SUMMARY OF THE INVENTION

The method according to the invention improves the control of the brake system, and in particular it reduces the amount of noise which the system produces during the automatic drive slip control cycle. The function of the pressure-limiting valve bridging the switching valve is reduced to a safety function, so that there is no longer any need to impose expensive noise requirements on this valve. It is especially advantageous that the outflow damper of this valve can be omitted.

It is especially advantageous that, especially when the pressure is being maintained, the pressure medium does not flow back into the master brake cylinder, which means that there is no flow across the switching valve—in contrast to the state of the art—during this phase of the control cycle.

Another advantage is to be seen, during the pressure level control phase at low temperatures, when the pump does not draw as strongly because of poor efficiency. Thus it would take a long time for the pressure to build up during the drive slip control cycle.

BRIEF DESCRIPTION OF THE DRAWING

FIG. 5 is a flow diagram of the second embodiment.

DESCRIPTION OF THE EXEMPLARY EMBODIMENTS

Figure 1:
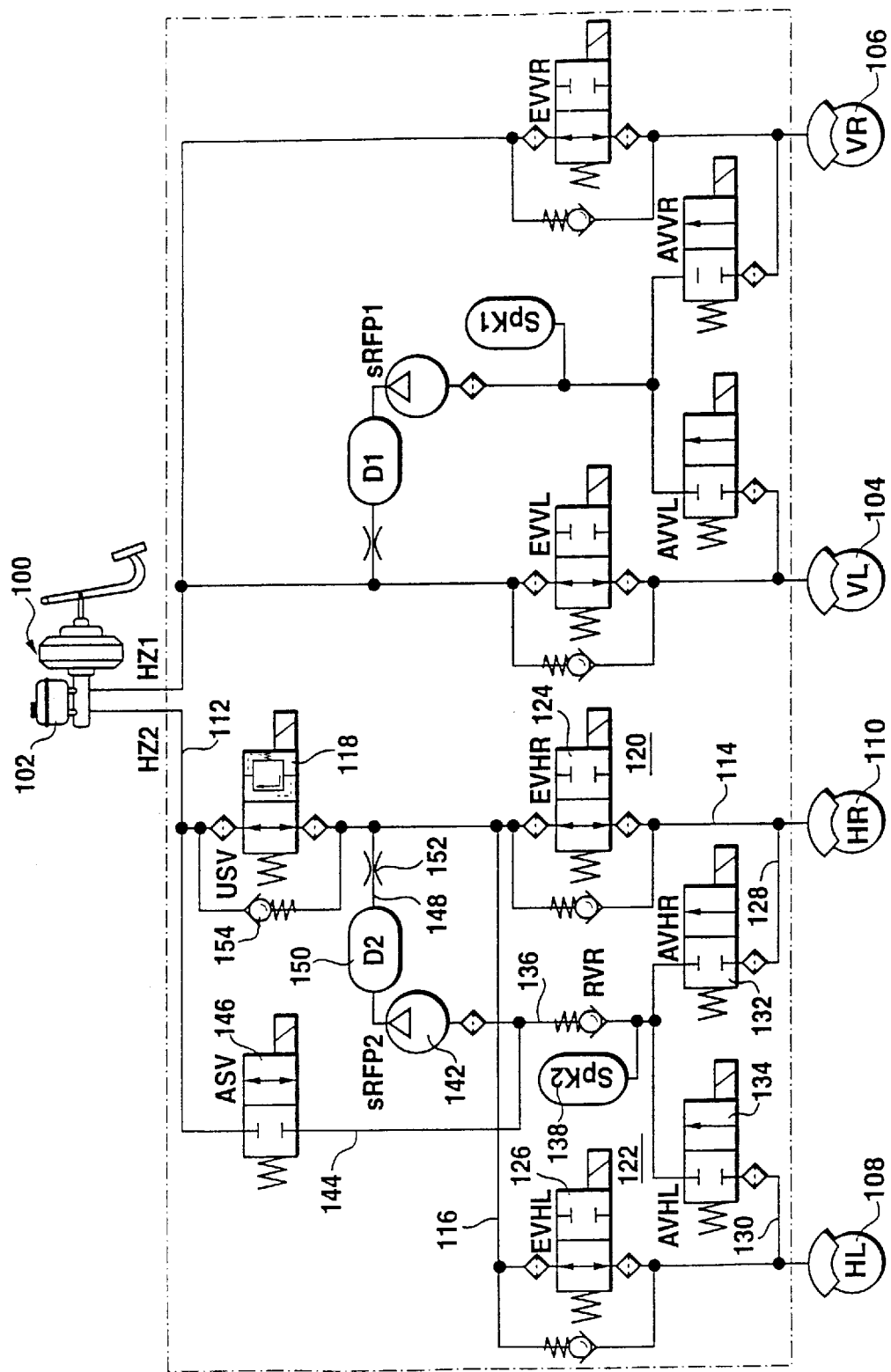
FIG. 1 shows an overall diagram of the brake system.

FIG. 1 shows a preferred exemplary embodiment of a hydraulic brake system for a rear-wheel drive vehicle with a pedal-actuated, twin-circuit master brake cylinder 100 with a pressure medium reservoir 102. A first brake circuit HZ1 is connected to wheel brakes 104, 106 of the nondriven front wheels of the vehicle. Wheel brakes 108, 110 of the driven rear wheels of the vehicle are connected to a second brake circuit HZ2. In the following, the second brake circuit HZ2, i.e., the one which is associated with the solution according to the invention, is explained in greater detail. This circuit has a brake line 112, proceeding from master brake cylinder 100; this line branches into two brake lines 114, 116, leading to wheel brakes 108, 110. A switching valve (USV) 118 with a spring-loaded open position and an electromagnetically switchable closed position is installed in brake line 112. On the wheel brake side, pressure control valve assemblies 120, 122 for modulating the braking pressure in wheel brakes 108, 110 are provided. Each valve assembly has an inlet valve 124, 126 (EVHR, EVHL) with a spring-loaded open position and an electromagnetically switchable closed position; the inlet valves 124, 126 are installed in the corresponding brake lines 114, 116 and control the feed of pressure medium to wheel brakes 110, 108. Between the inlet valve and the wheel brake, a return line 128, 130 proceeds from the brake line in question. An outlet valve 132, 134 (AVHR, AVHL) is installed in each of the return lines 128, 130. The outlet valve has a spring-loaded closed position and an electromagnetically switchable open position. Return lines 128, 130 join to form a common return line 136, to which a storage chamber 138 (SpK2) is connected. In addition, the brake circuit has a high pressure-generating pump 142, driven by an electric drive motor. The pump sRFP2, designed as a self-priming unit, is connected by an intake line 144 to brake line 112, namely, at a point between master brake cylinder 100 and switching valve 118. In intake line 144 there is an intake control valve 146 (ASV) with a spring-loaded closed position and an electromagnetically switchable open position. Return line 136 is connected on the intake side of pump 142 to intake line 144. On the delivery side, pump 142 is connectd by a delivery line 148 to brake line 112 at a point between switching valve 118 and pressure control valve assemblies 120, 122. A damper chamber 150 and a throttle 152 are installed in delivery line 148. In addition, a pressure-limiting valve 154 bridges switching valve 118; when switching valve 118 is closed, this pressure-limiting valve opens brake line 112 in the direction of the master brake cylinder when a certain response pressure is exceeded.

The first brake circuit is designed in the same way as the second circuit except that, as shown in the illustration according to FIG. 1, it does not have the devices (USV, ASV) required for automatic slip control because it controls the brakes of the nondriven wheels.

In the case of all-wheel drive vehicles or in conjunction with a system of automatic dynamic drive control, the first brake circuit would be designed in exactly the same way as the second brake circuit.

In addition to the division of the brake circuit shown here, the method according to the invention can also be applied to any other division of the brake circuit (e.g., in a so-called X-type brake circuit division, where the two brakes diagonally opposite each other are combined into a single brake circuit).

The brake system illustrated in FIG. 1 is controlled by an electronic control unit (not shown), which is connected by output lines to the actuatable valves and to the pump or pumps. In addition, input lines, which proceed from measuring apparatuses for detecting at least the velocities of the vehicle wheels, are also connected to the electronic control unit. The electronic control unit, which comprises at least one microcomputer, determines the drive slip of the driven wheels from the wheel velocity signals being transmitted to it. This is done, for example, by comparison of the wheel velocity of a driven wheel with the mean value of the wheel velocities of the nondriven wheels. When a defined slip threshold is exceeded, the microcomputer generates drive signals for the pump and the valves and also generates pulses for building up and releasing the pressure in such a way as to modulate the braking pressure in the wheel brake or brakes of the slipping wheel or wheels to reduce the drive slip to a predetermined value.

In addition to the application to the preferred brake system illustrated, the method according to the invention can also be applied advantageously to any brake system in which at least one pressure-generating means is provided to generate pressure, in which the brake line to all the wheel brakes of a brake circuit can be closed by an electrically controlled valve, and in which valve assemblies are provided which can be driven in such a way as at least to decrease the pressure individually in each wheel brake.

The way in which the brake system illustrated in FIG. 1 is controlled within the scope of the solution according to the invention is explained in greater detail below on the basis of the pressure curve shown in FIG. 2 and the flow diagram shown in FIG. 3.

The basic idea of the solution according to the invention is that, to maintain the pressure in a wheel brake during the automatic drive slip control phase, a pressure level control process is carried out by means of the pulse width-modulated driving of an outlet valve assigned to the wheel brake in question. During the automatic pressure level control cycle, the modulation volume required to modulate the pressure is sent via the outlet valve to a storage chamber 138 for the initial release of pressure; during the subsequent pressure buildup, volume is taken only from the storage chamber and supplied to the wheel brake cylinder via the inlet valve. During the following pressure release, pressure medium is then released again via the outlet valve into the storage chamber. This means that, within the hydraulic system, a closed circuit is created, which protects the master brake cylinder from any reactive effects during the control phase. During the pressure level control phase, no pressure medium flows back through the switching valve. The amount of noise which is produced is decreased to a corresponding extent, and the requirements on the switching valve are also decreased, which means that the valve can be designed more cheaply.

Figure 2:
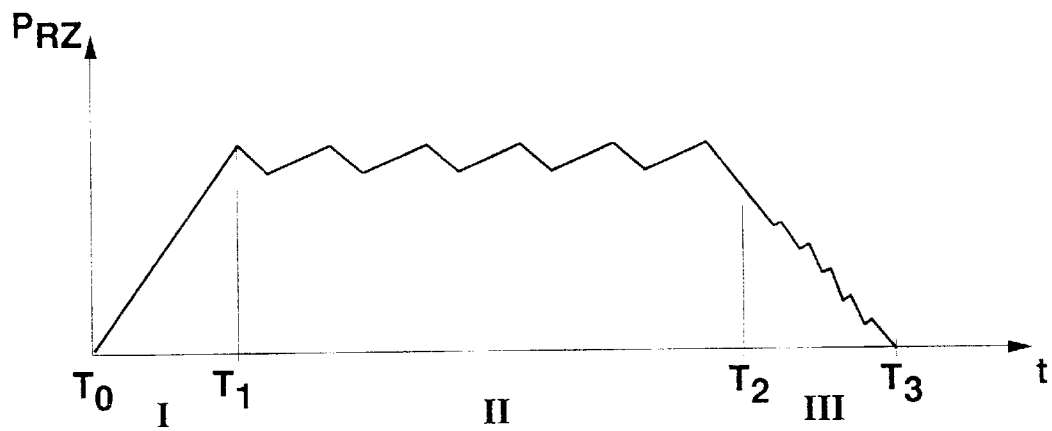
FIG. 2 shows an example of how the pressure in the wheel brake cylinder changes in accordance with a first exemplary embodiment.

FIG. 2 shows the time on the horizontal axis and the pressure in the brake cylinder of the wheel showing elevated drive slip on the vertical axis.

At time $T_0$, the electronic control unit analyzes the wheel velocities to determine which drive wheel is showing an elevated degree of drive slip. At time $T_0$, therefore, a pressure buildup phase (phase I) is begun, for the purpose of which the intake valve is opened, the switching valve is closed, and the pump is turned on. The pump draws pressure medium from the reservoir through the open intake valve and conveys it through the opened inlet valve or valves into the wheel brake cylinders. This has the effect of increasing the pressure until time $T_1$ is reached, as shown in FIG. 2. At time $T_1$, the electronic control unit recognizes that the excessive level of drive slip has disappeared (the wheel velocity difference falls below the threshold) and initiates the pressure level control phase (phase II). At time $T_1$, the intake valve 146 is closed, but the inlet valves 124, 126 remain open. The pump is still running during this phase. As part of the pressure level control phase, the outlet valve is driven in a pulse width-modified manner in such a way that a certain pressure range is maintained. During the initial pressure decrease, the modulation volume required for modulating the pressure is sent through the open outlet valve to storage chamber 138, so that, during the rest of the pressure control process, the pressure medium for the pressure buildup can be taken from the storage chamber and does not have to be supplied via the intake valve. When pressure is being released, the release volume is transferred to the storage chamber and not diverted via the switching valve. As a result of these short-term pressure releases and buildups, the pressure level in the wheel brake cylinder is kept within a nominal bandwidth. The automatic control during this second phase has a sawtooth like characteristic.

Phase II is therefore also referred to as "outlet valve sawtooth control". The average nominal pressure level to be maintained during this phase is the result of the determined magnitude of the slip, which is kept within a predetermined bandwidth.

At time $T_2$, the electronic control unit recognizes on the basis of the extent of the slip that the pressure should now be decreased (phase III). Through the outlet valve, which is kept open for a longer period of time in this situation, the pump takes, from the wheel brake cylinder, a quantity of pressure medium equal to the maximum volume of the storage chamber. This is done because, even if there is only a small difference between the wheel brake cylinder pressure and the storage chamber pressure, the pressure medium flows away faster than it can be supplied again to the wheel brake cylinder by the pump. If the withdrawal of an amount of pressure medium equal to the maximum capacity of the storage chamber is not enough to decrease the pressure sufficiently, then, while the outlet valve is open, the intake valve is closed, and the pump is running, the switching valve is opened in a pulse width-modulated manner in such a way that the pressure is decreased in small steps with little or no feedback. The pressure medium then flows back to the reservoir.

If it becomes necessary during phase II to increase the pressure level beyond the bandwidth, the pressure is built up in phase II by withdrawing pressure medium from the storage chamber and delivering it by means of the pump to the wheel brake cylinder. If the volume of the storage chamber is not enough to build up the pressure sufficiently, that is, if additional volume is required, the pressure buildup is carried out in the same way as it is in phase I.

In a preferred exemplary embodiment, the brake system according to the invention is controlled by a microcomputer. The way in which the electronic control unit is designed to work is sketched in the flow diagram shown in FIG. 3.

Figure 3:
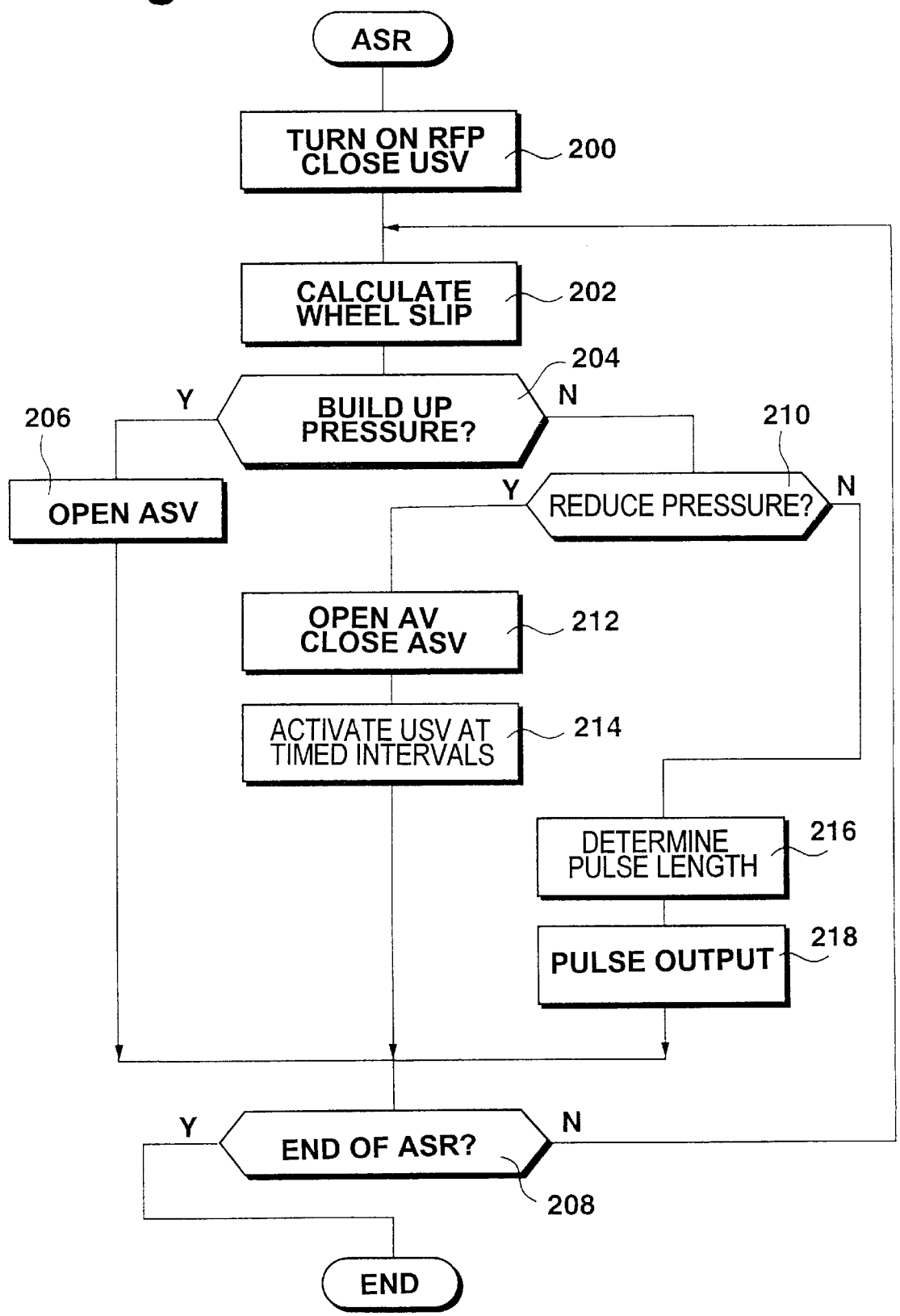
FIG. 3 is a flow diagram of the first exemplary embodiment.

The subprogram illustrated in FIG. 3 is called up when the anti-slip control situation occurs, that is, when, for the first time, a predetermined threshold is exceeded by the slipping of a wheel. In the first step 200, the switching valve is closed and the return pump is activated. Thereupon, in step 202, the extent of the wheel slip is calculated. This calculation is accomplished by means of the methods known in and of themselves to the expert. In the preferred exemplary embodiment, the wheel velocity of the drive wheel in question is compared with a reference velocity formed from the mean value of the velocities of the nondriven wheels. Any other suitable method of determining the extent of the wheel slip can also be used within the scope of step 202. In the next step 204, the program decides on the basis of the wheel slip, when its magnitude exceeds a predetermined threshold, whether pressure should be built up in the wheel brake cylinder or not. If this is the case, then in step 206 the intake valve is opened. As a result, pressure medium flows from the reservoir through the opened intake valve, via the return pump, and through the open inlet valve into the corresponding wheel brake cylinder. After the intake valve has been opened, the program checks to see in step 208 whether the anti-slip control phase has ended. This is the case when, for example, the driver has actuated the brake pedal or the pressure in the wheel brakes has been completely released without any further occurrence of slip. If this is the case, this section of the program is terminated; otherwise, step 202 is repeated. As long as the wheel slip exceeds the threshold defined for the pressure buildup, pressure is built up via the opened intake valve. This leads to the behavior referred to as "phase I" in FIG. 2. When the wheel slip threshold falls below the predetermined limit value for the pressure buildup, the program checks in step 210 to see whether pressure should be released or not. This, too, is accomplished on the basis of the extent of the wheel slip. If the wheel velocity difference or the wheel slip falls below a defined (negative) limit value, the program concludes that pressure should be released. For this purpose, the outlet valve is opened and the intake valve is closed in step 212. Then, in step 214, a control signal for driving the switching valve is generated, which opens and closes the switching valve at a predetermined timing ratio during the pressure release phase. Then step 208 is executed. The functions carried out in steps 212 and 214 lead to the pressure curve referred to as "phase III" in FIG. 2. If the wheel slip or the wheel velocity remains within a predefined range, the brake pressure is modulated as part of the pressure level control cycle. In that case, according to the preferred exemplary embodiment, a drive pulse of predetermined length for a short period of pressure release is determined in step 216 and transmitted in step 218 to the appropriate outlet valve. In conjunction with the running of the subprogram at predetermined times, this design results in a pulse width-modulated drive signal for the outlet valve, which leads to the sawtooth course of the pressure illustrated as phase II in FIG. 2.

In the preferred exemplary embodiment, the length of the pulse for driving the outlet valve is predetermined. In other advantageous exemplary embodiments, this pulse length can be determined as a function of operating parameters such as the brake pressure, the temperature, the wheel velocity, the amount of slip, etc.

In addition to the embodiment illustrated in FIG. 3, in which a distinction is made between the three indicated phases on the basis of the amount of wheel slip or the difference between the velocities of the wheels, it is possible in other advantageous exemplary embodiments for the program to determine a nominal pressure from the wheel slip and to use the difference between this nominal pressure and the actual pressure to decide whether to increase, decrease, or maintain the existing pressure.

The section of the program shown in FIG. 3 is a subprogram for controlling one of the drive wheels. A similar approach is provided for the wheel brakes of the other drive wheels of the vehicle.

In the brake circuit division shown in FIG. 1 and in vehicles with all-wheel drive, it is possible in certain driving situations, especially those in which different friction values are present at the drive wheels, for the application of the pressure level control system to two drive wheels to impair the stability of the automatic control. This is so because, as a result of the sawtooth-like control at the two drive wheels, the two different control processes can interact with each other in such a way as to intensify the pressure fluctuations. This impairs the driving behavior of the vehicle. It has been discovered that this interaction occurs when a high pressure level is being adjusted at one wheel brake cylinder and a low pressure level at another wheel brake cylinder. To improve the stability of the control, as soon as the difference between the actual pressures in the two wheel brake cylinders exceeds a certain value, therefore, the control method shown in FIG. 3 is replaced by a different automatic control concept for the wheel with the lower pressure level. In the preferred exemplary embodiment of this different control strategy, pressure is built up or released as a function of whether the slip value exceeds or falls below the threshold, and a pressure hold phase of predetermined length is inserted between the pressure buildup and the pressure release phase. This control is implemented by driving the inlet and outlet valves. The essential point here is that, even with this control strategy, the intake valve remains closed during phase II; the pump delivers the medium from the storage chamber; and the return flow of pressure medium back to the master cylinder circuit is largely eliminated.

Figure 4:
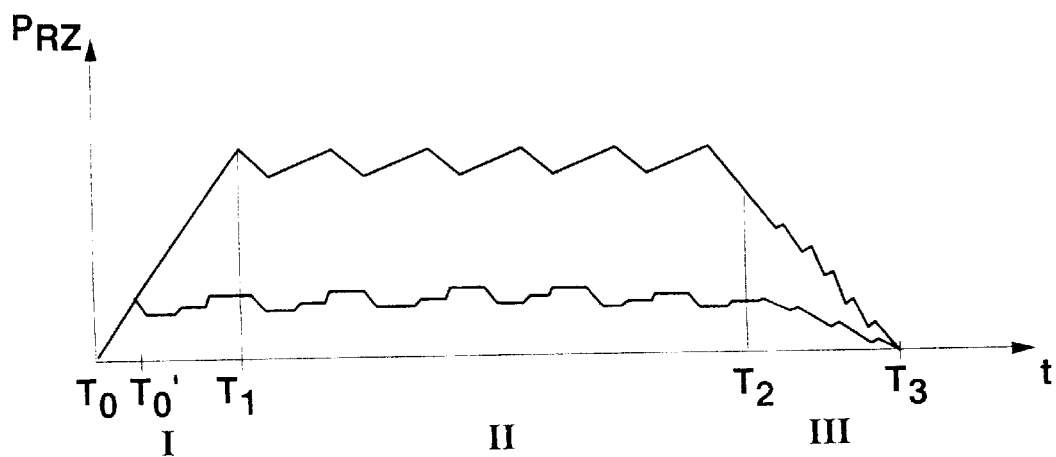
FIG. 4 shows how the pressures in the wheel brake cylinders change in accordance with a second exemplary embodiment.

FIG. 4 shows the pressure curves for two drive wheels. The control strategy already explained on the basis of FIGS. 2 and 3 is applied to the wheel at which the higher pressure buildup occurs. The other control strategy is used at the wheel where the pressure buildup is not so high. At time $T_0$, slip occurs at two drive wheels. This leads in correspondence with the diagram in FIGS. 2 and 3 to the buildup of pressure in the corresponding wheel brake cylinders. At time $T_0'$, the amount of slip falls below the threshold at one of the wheels. This means that this wheel enters phase II, in which, by means of the pulse-width modulated control of the outlet valve, the pressure level is automatically controlled. Shortly after time $T_0'$, the pressure difference between the two wheel brake cylinders exceeds the predefined threshold value. This means that a switch is made to a different control strategy for the pressure level control in the wheel brake cylinder with the lower pressure level. When the slip threshold is exceeded, pressure is built up by closing the outlet valve until the slip again falls below the threshold. This is followed by a hold phase with closed inlet and outlet valves; and, when the slip falls, pressure is released again by opening the outlet valve. The curve of the pressure which results in the wheel brake cylinder as a result of this strategy is illustrated in FIG. 4.

The corresponding procedure for one wheel is illustrated in the flow diagram of FIG. 5.

How the program begins and what steps 300, 302 do can be derived from corresponding steps 200, 202 FIG. 3. In the following step 304, the wheel pressure prevailing in the wheel brake cylinder is estimated by means of, for example, the pressure buildup and pressure release times; or, in an advantageous exemplary embodiment, it is actually measured. The wheel pressure of the other wheel is accepted as input; and in the following step 306, the value of the difference between the two wheel pressure values is compared with a predetermined threshold value Δ. If the difference falls below this predetermined threshold, the program goes to step 308, where it executes steps 204–218, which have already been explained in conjunction with FIG. 3. If the pressure difference exceeds the threshold, the program continues with 310.

As an alternative to comparing pressures, it is possible in step 304 to estimate the adhesion coefficient according to methods known in and of themselves. The decision on where to go in step 306 would then be made on the basis of the difference between the adhesion coefficients at the two wheels.

In step 310, the program checks to see whether the wheel controlled by this subprogram is the one with the lower pressure value. If this is not the case, the program continues with step 308. Otherwise, the program switches to the different control strategy, according to which step 312 checks to see whether the wheel slip has exceeded a predetermined threshold. If it does exceed the threshold, in step 314 the outlet valve is closed and the inlet valve opened for a certain time to allow the pressure to build up. If the wheel slip is below the threshold, in step 318 the outlet valve is opened to allow the pressure to escape. After step 314 or step 318, the outlet valve and the inlet valve are closed for a certain time in step 320, so that no change occurs in the pressure. After step 320, step 308 is executed in correspondence with the procedure for step 208 illustrated in FIG. 3.

I claim:

1. Method for controlling a brake system of a vehicle having wheels including a drive wheel, a wheel brake associated with one of said wheels, an inlet valve and an outlet valve assigned to said wheel brake, and a pressure pump increasing pressure in said wheel brake, said method comprising:

determining slip of the drive wheel;

actuating said pump and opening said inlet valve to supply pressure to the wheel brake responsive to a determination that said drive wheel is slipping;

responsive to a determination that the slip of the drive wheel is within a predetermined range, opening said outlet valve for predetermined time intervals while said pump remains actuated and said inlet valve remains open so that the pressure in said wheel brake is held substantially constant;

reducing the pressure in the wheel brake by closing the inlet valve and opening the outlet valve responsive to a determination that the slip of the drive wheel is below a predetermined limit value.

2. Method according to claim 1, wherein the intermittent opening of the outlet valve occurs during the course of an automatic control phase in which the pressure in the wheel brake is kept at a constant average value.

3. Method according to claim 1, wherein the wheel brake has a wheel brake cylinder and a connection with a master brake cylinder having a reservoir, and, during the intermittent opening of the outlet valve, the connection between the wheel brake cylinder and the master brake cylinder or its reservoir is cut off.

4. Method according to claim 1, wherein the pressure in the wheel brake is modulated by the intermittent opening of the outlet valve, pressure medium being sent to a storage chamber when the pressure is being released, and volume being taken from the storage chamber and sent by the pump to the wheel brake cylinder when pressure is being increased.

5. Method according to claim 1, wherein the wheel brake has a wheel brake cylinder with a connection with a master brake cylinder, and, when the slip exceeds a predetermined limit, the connection between the wheel brake cylinder and the master brake cylinder is opened to build up the pressure.

6. Method according to claim 1, wherein the wheel brake has a wheel brake cylinder with a connection with a master brake cylinder, and, to release the pressure, a switching valve in said connection between the wheel brake cylinder and the master brake cylinder is opened briefly.

7. Method according to claim 1 wherein two of the wheels are drive wheels to which automatic slip control is applied, said drive wheels each being associated with wheel brakes with inlet and outlet valves associated therewith for applying pressure thereto, and said method further comprising determining when adhesion coefficients at the two drive wheels to which automatic slip control is being applied are different, detecting which of the brakes is subjected to greater pressure and which of said brakes is subjected to lower pressure; and responsive to determination of said different adhesion coefficients, intermittently opening the outlet valve at the wheel brake subjected to the greater pressure, whereas, at the wheel brake with the lower pressure, the pressure level is maintained by a different control strategy.

8. Method for controlling the brake system of a vehicle having wheels, two of the wheels being drive wheels to which automatic slip control is applied, said drive wheels each being associated with wheel brakes each having a wheel brake cylinder and inlet and outlet valves associated therewith for applying brake pressure thereto, said method comprising:

when one of the drive wheels is experiencing an elevated level of slip, braking said drive wheel, the brake pressure being built up and released in the wheel brake cylinder of the drive wheel with increased slip so that the slip of said drive wheel is reduced, a valve bringing about the release in pressure in the wheel brake cylinder in question being actuated at timed intervals so that the pressure is first released and then built back up again to maintain the slip of the wheel within a certain range, determining when adhesion coefficients at the two drive wheels to which automatic slip control is being applied are different, detecting which of the brakes is subjected to greater pressure and which of said brakes is subjected to lower pressure; and, responsive to determination of said different adhesion coefficients, the outlet valve at the wheel brake subjected to the greater pressure is opened intermittently, whereas, at the wheel brake with the lower pressure, the pressure level is maintained by a different control strategy, and altering the intermittent opening of the outlet valve to the different control strategy based on a pressure difference between the wheel brakes of the two drive wheels.

9. Apparatus for controlling a brake system of a vehicle, having wheels including a drive wheel, a wheel brake associated with one of said wheels, an inlet valve and an outlet valve assigned to said wheel brake, and a pressure pump increasing pressure in said wheel brake, said apparatus comprising:

means for determining slip of the drive wheel;

means for actuating said pump and opening said inlet valve to supply pressure to the wheel brake responsive to a determination that said drive wheel is slipping;

means for opening, responsive to a determination that the slip of the drive wheel is within a predetermined range, said outlet valve for predetermined time intervals with said pump actuated and said inlet valve open so that the pressure in said wheel brake is held substantially constant;

means for reducing the pressure in the wheel brake by closing the inlet valve and opening the outlet valve responsive to a determination that the slip of the drive wheel is below a predetermined limit value.

* * * * *